United States Patent
Chen et al.

(10) Patent No.: US 7,589,886 B1
(45) Date of Patent: Sep. 15, 2009

(54) WAVELENGTH CONVERTER STRUCTURE AND METHOD FOR PREPARING THE SAME

(75) Inventors: Yi Zhong Chen, Hsinchu (TW); Shang Ling Liu, Hsinchu (TW); Yi Jiun Chuang, Hsinchu (TW); Cheng Hsiung Wu, Hsinchu (TW); Ming Hsien Chou, Hsinchu (TW)

(73) Assignee: HC Photonics Corp., Hsinchu (TW)

( * ) Notice: Subject to any disclaimer, the term of this patent is extended or adjusted under 35 U.S.C. 154(b) by 0 days.

(21) Appl. No.: 12/189,997

(22) Filed: Aug. 12, 2008

(51) Int. Cl.
*G02F 1/35* (2006.01)
*G02B 6/10* (2006.01)

(52) U.S. Cl. .................. 359/332; 385/129; 385/132

(58) Field of Classification Search ......... 359/326–332; 385/129–132
See application file for complete search history.

(56) References Cited

U.S. PATENT DOCUMENTS

| | | | |
|---|---|---|---|
| 5,737,117 A | 4/1998 | Imaeda et al. | |
| 6,129,864 A | 10/2000 | Imaeda et al. | |
| 6,631,231 B2 | 10/2003 | Mizuuchi et al. | |
| 7,171,094 B2* | 1/2007 | Mizuuchi et al. | 385/129 |
| 7,236,674 B2 | 6/2007 | Mizuuchi et al. | |
| 7,373,065 B2* | 5/2008 | Yamaguchi et al. | 385/129 |
| 2007/0297732 A1 | 12/2007 | Mason | |
| 2009/0009854 A1* | 1/2009 | Yoshino | 359/332 |

FOREIGN PATENT DOCUMENTS

WO  WO 2005067031 A1 *  7/2005

* cited by examiner

*Primary Examiner*—Hemang Sanghavi
(74) *Attorney, Agent, or Firm*—WPAT, P.C.; Anthony King; Kay Yang

(57) ABSTRACT

A wavelength converter structure comprises a supporting substrate, a ferroelectric substrate having at least one ridge waveguide including a plurality of periodic poled regions positioned on a first side of the ferroelectric substrate, and at least one controlling pattern positioned on a second side of the ferroelectric substrate. The ridge waveguide is joined to the supporting substrate via an adhesive, and the second side is opposite to the first side.

11 Claims, 5 Drawing Sheets

WAVELENGTH CONVERTER STRUCTURE AND METHOD FOR PREPARING THE SAME

BACKGROUND OF THE INVENTION (A) Field of the Invention

The present invention relates to a wavelength converter structure and method for preparing the same, and more particularly, to a wavelength converter structure including at least one ridge waveguide having a periodic poled region and method for preparing the same.

(B) Description of the Related Art

Quasi-phase matching (QPM) is a technique for phase matching nonlinear optical interactions in which the relative phase is corrected at regular intervals using a structural periodicity built into the nonlinear medium, and the most popular case of interest in modern QPM technology is called frequency doubling or second harmonic generation (SHG).

U.S. Pat. No. 5,737,117 discloses, in FIG. 2b, a second harmonic generation element including a single crystal substrate having a fundamental composition of $K_3Li_{2-2x}(Nb_{1-y}Ta_y)_5+5zO_{15-x+12.5z}$ and an optical waveguide made of an epitaxial film with a fundamental composition of $K_3Li_{2-2a}(Nb_{1-b}Ta_b)_5+5cO_{15-a+12.5c}$ and refractive index different from that of the single crystal substrate.

U.S. Pat. No. 6,129,864 discloses a process for producing an optical waveguide substrate including a ridge-shaped structural portion containing at least an optical waveguide, which process including the steps of forming an optical waveguide-forming layer on a substrate body to prepare a substrate workpiece, and forming said ridge-shaped structural portion at said substrate workpiece by grinding.

U.S. Pat. No. 6,631,231 B2 discloses an optical waveguide element including a three-dimensional optical waveguide of a bulky non-linear optical crystal, a substrate, and a joining layer made of an amorphous material. The substrate is joined to the optical waveguide via the joining layer.

U.S. Pat. No. 7,171,094 B2 discloses an optical waveguide device including a waveguide layer that converts a wavelength of incident light and emits converted light. In the waveguide layer, a ridge waveguide and slab waveguides are provided, the slab waveguides being formed on both sides of the ridge waveguide with recess portions intervening therebetween. The waveguide layer satisfies a multi-mode condition for the incident light, and light propagating through the ridge waveguide is in a single mode.

U.S. Pat. No. 7,236,674 B2 discloses an optical waveguide device having a substrate composed of a nonlinear optical material and a periodically domain-inverted structure having the same composition as the nonlinear optical material, where the domain-inverted structure has a refractive index distribution relying on the domain-inverted structure.

US 2007/0297732 A1 discloses Optical waveguide devices characterized by low loss for a fundamental mode and high loss for higher order modes are disclosed. The high loss is sufficiently high that the waveguide is effectively single-moded.

SUMMARY OF THE INVENTION

One aspect of the present invention provides a wavelength converter structure including at least one ridge waveguide having a periodic poled region and method for preparing the same.

A wavelength converter structure according to this aspect of the present invention comprises a supporting substrate, a ferroelectric substrate having at least one ridge waveguide including a plurality of periodic poled regions positioned on a first side of the ferroelectric substrate, and at least one controlling pattern positioned on a second side of the ferroelectric substrate. The ridge waveguide is joined on the supporting substrate via an adhesive, and the second side is opposite to the first side.

Another aspect of the present invention provides a method for preparing a wavelength converter structure comprising the steps of forming a periodic poled element including a ferroelectric substrate and at least one periodic poled region in the ferroelectric substrate, forming at least one ridge waveguide on a first side of the ferroelectric substrate by removing at least a portion of the ferroelectric substrate outside the periodic poled region, joining the first side to a supporting substrate, and forming at least one controlling pattern on a second side of the ferroelectric substrate with the second side being opposite to the first side.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
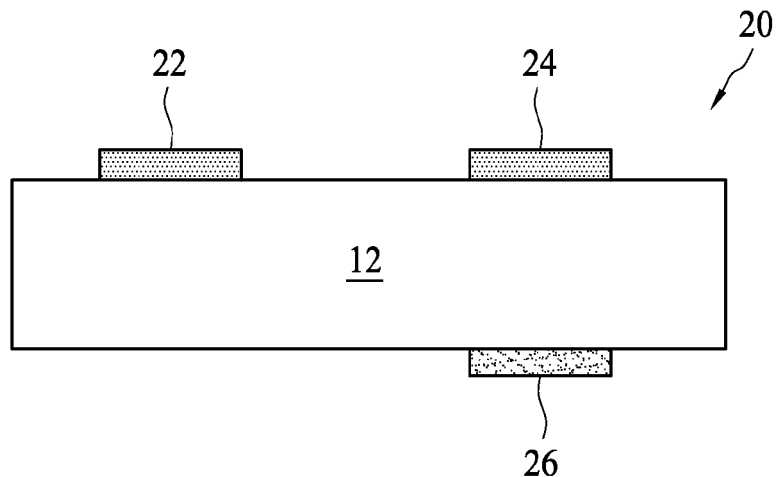
FIG. 1 to FIG. 6 illustrate a method for preparing a wavelength converter structure according to one embodiment of the present invention.

FIG. 1 to FIG. 6 illustrate a method for preparing a wavelength converter structure 10 according to one embodiment of the present invention. Deposition and etching processes are performed to form an electrode structure 20 including a first electrode 22 and a second electrode 24 on a first side (e.g. top surface) of a ferroelectric substrate 12 and a third electrode 26 on a second side (e.g. bottom surface) of the ferroelectric substrate 12. In one embodiment of the present disclosure, the first electrode 22 and the second electrode 24 can be comb-shaped, and the second electrode 24 is positioned on the top surface as a mirror image of the first electrode 22, i.e., the finger portion of the first comb-shaped electrode 22 directs to that of the second comb-shaped electrode 24.

Figure 2:
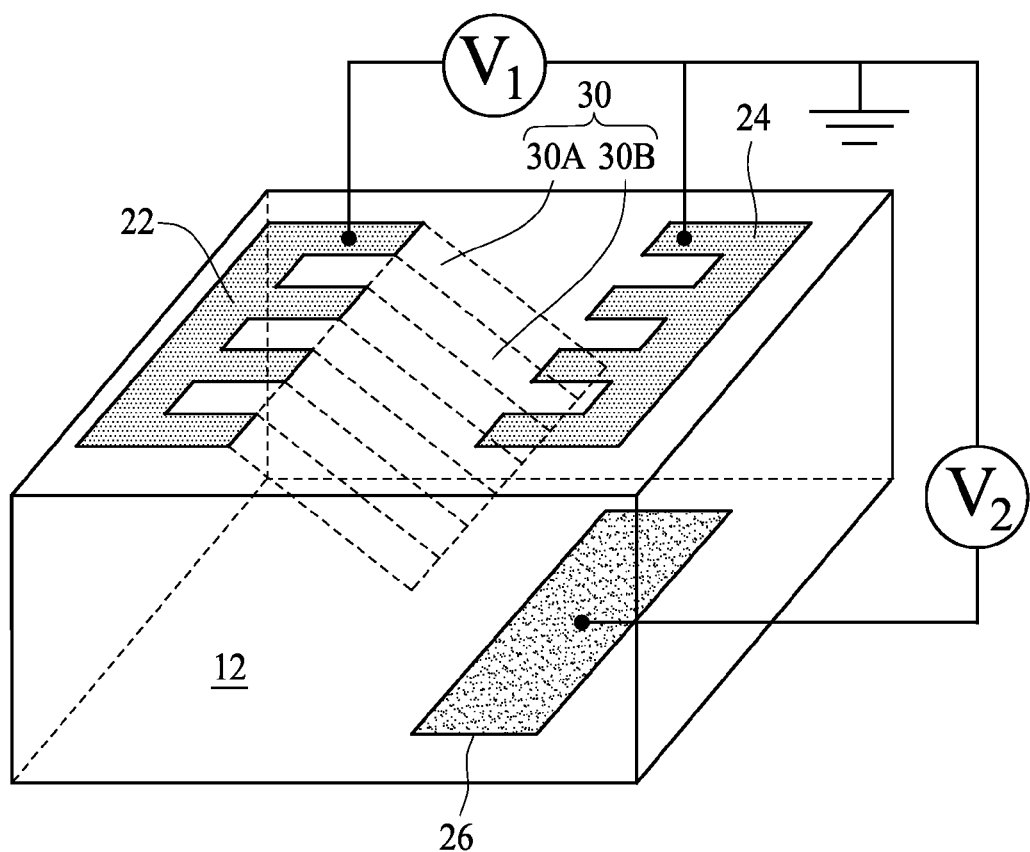

Referring to FIG. 2, a poling process is performed on the electrode structure 20 by applying predetermined voltages to the electrode structure 20 to form a periodic poled element 10 having a periodic poled region 30 in the ferroelectric substrate 12. The periodic poled region 30 includes a plurality of inverted domains 30A having a first polarization direction and a plurality of non-inverted domains 30B interleaved between the inverted domains 30A, wherein the non-inverted domain 30B has a second polarization direction substantially opposite to the first polarization direction. Preferably, the poling process is performed by applying a first voltage to the first comb-shaped electrode 22, a second voltage to the second comb-shaped electrode 24 and a third voltage to the third electrode 26. Preferably, the first voltage is higher than the second voltage, the first voltage is higher than the third voltage, and the third voltage is higher than or equal to the second voltage.

Figure 3:
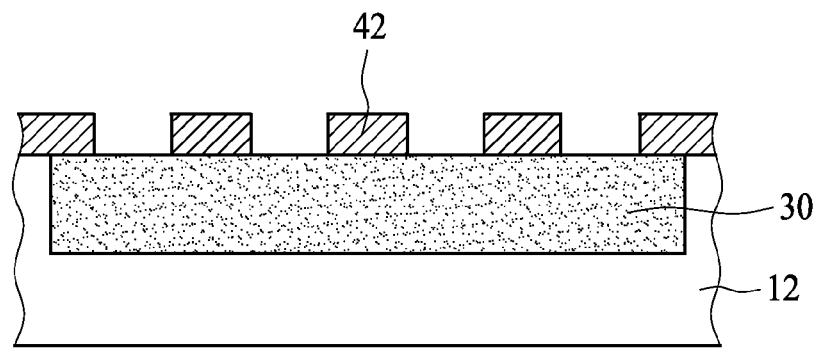
Figure 4:
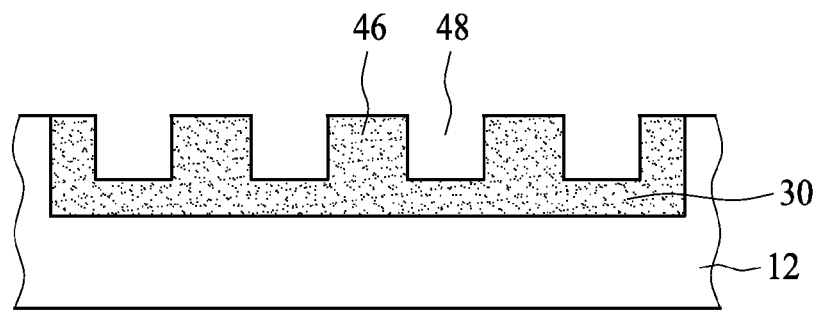

Referring to FIG. 3, the first comb-shaped electrode 22, the second comb-shaped electrode 24 and the third electrode 26 are removed from the ferroelectric substrate 12, and a mask layer 42 covering at least a portion of the periodic poled region 30 is formed on the first side of the ferroelectric substrate 12 by deposition and lithographic processes. Subsequently, an etching process is performed to remove a portion of the ferroelectric substrate 12 not covered by the mask layer 42 to form a plurality of ridge waveguides 46 in the ferroelectric substrate 12, and the mask layer 42 is then removed, as shown in FIG. 4. In other words, the etching process removes a portion of the ferroelectric substrate 12 inside the periodic poled region 30, and the ridge waveguides 46 are separated by air gaps 48 and may have different profiles.

Figure 5:
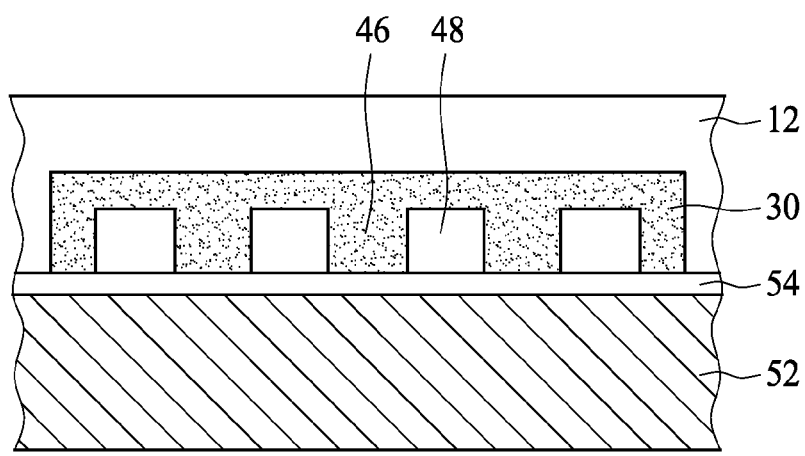
Figure 6:
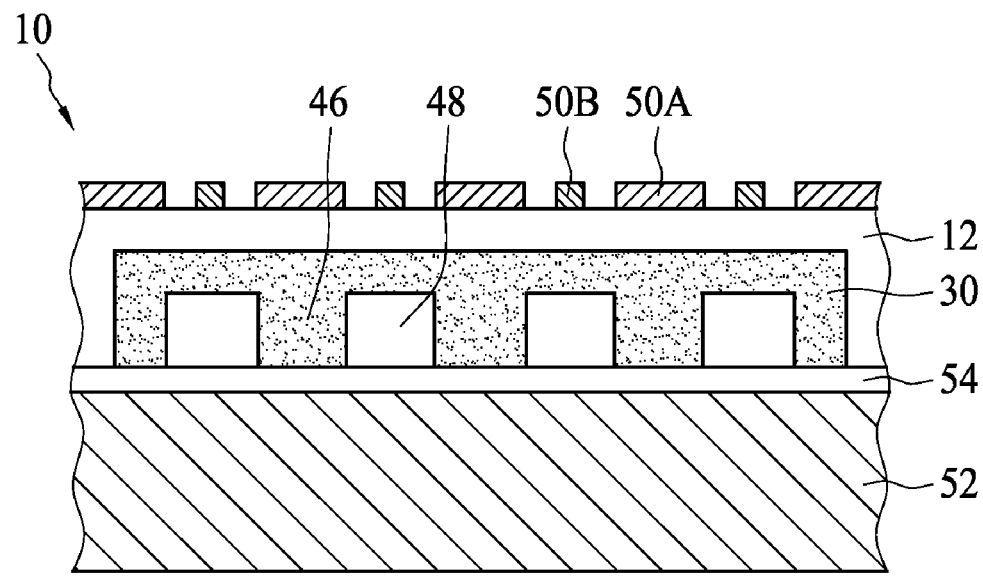

Referring to FIG. 5, the top surface of the ferroelectric substrate 12 is joined to a supporting substrate 52, i.e., in an upside-down manner. In one embodiment of the present disclosure, the ferroelectric substrate 12 is joined to a supporting substrate 52 via an adhesive 54, and the refraction index of the adhesive 54 is smaller than the refraction index of the ferroelectric substrate 12. In particular, the adhesive 54 may fill at least a portion of the air gaps 48 or completely fills up the air gaps 48. Subsequently, deposition and etching processes are performed to form at least one controlling pattern such as Bragg grating structures 50A or conductive wires 50B on a second side of the ferroelectric substrate 12 to complete the wavelength converter structure 10, as shown in FIG. 6.

The Bragg grating structures 50A are formed right on the ridge waveguides 46 and configured to only allow a light beam with a predetermined wavelength to propagate in the ridge waveguides 46. The conductive wires 50B are formed aside to ridge waveguides 46 and configured to control the temperature of the ridge waveguides 46 in a predetermined operation range. In one embodiment of the present disclosure, the thickness of the ferroelectric substrate 12 is optionally reduced before the forming of the controlling pattern by removing a portion of the ferroelectric substrate 12 from the second side, e.g. by polishing or etching process.

Figure 7:
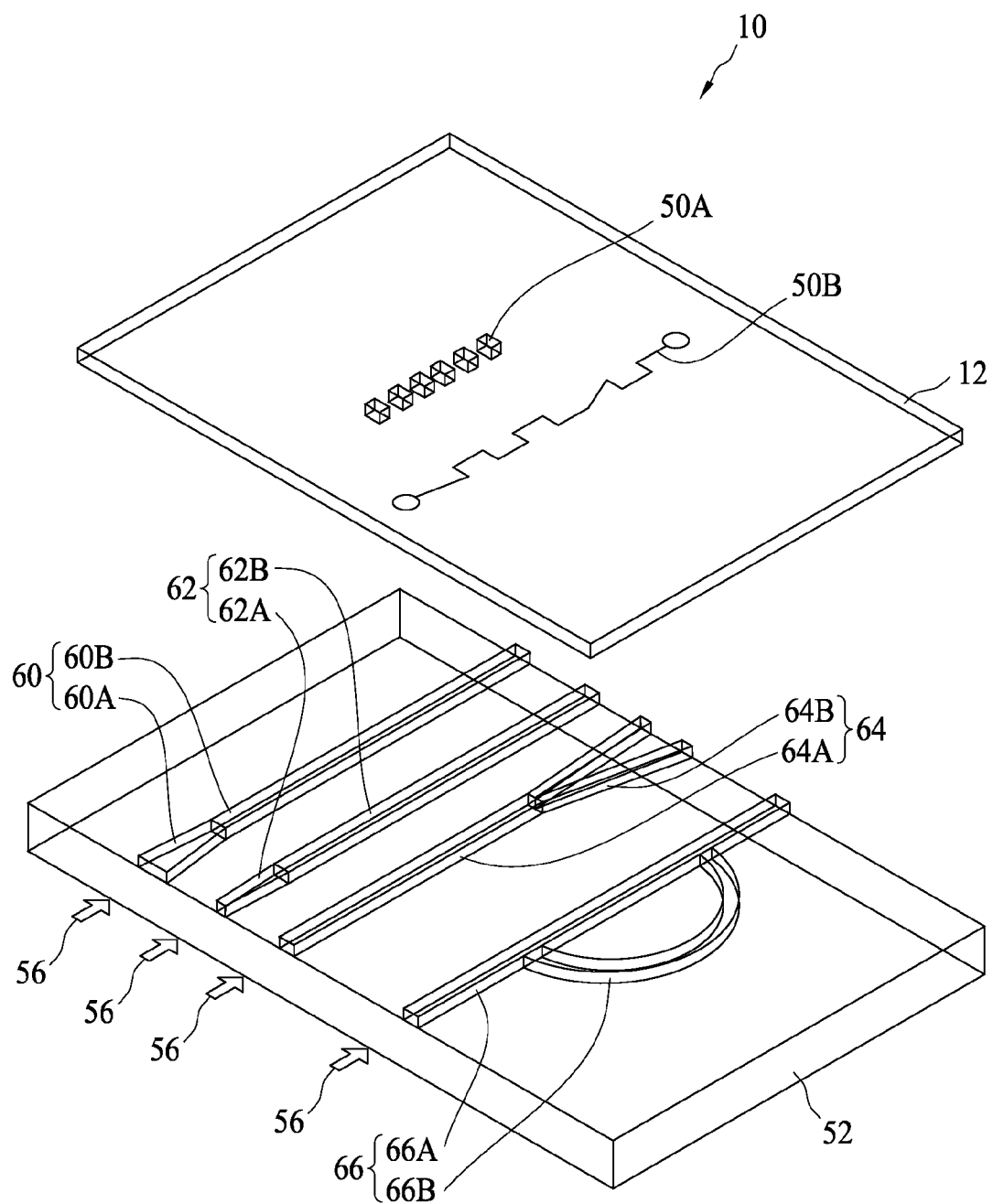
FIG. 7 illustrates a plurality of different designs of the ridge waveguides according to one embodiment of the present invention.

FIG. 7 illustrates a plurality of different designs of the ridge waveguides according to one embodiment of the present invention. In one embodiment of the present disclosure, a ridge waveguide 60 may include a taper input waveguide 60A and an output waveguide 60B coupled to the input waveguide 60A, wherein the width of the taper input waveguide 60A decreases from an input end for a light beam 56 gradually to the width of the output waveguide 60B. In another embodiment of the present disclosure, a ridge waveguide 62 may include a taper input waveguide 62A and an output waveguide 62B coupled to the input waveguide 62A, wherein the width of the taper input waveguide 62A increases from an input end for the light beam 56 gradually to the width of the output waveguide 62B. In addition to the taper input portion, the ridge waveguides 60 and 62 can be optionally designed to have a taper output portion, so as to increase the input and output coupling efficiency as well as the efficiency of active or electro-optic devices.

In a further embodiment of the present disclosure, a ridge waveguide 64 may include an input waveguide 64A and two output waveguides 64B coupled to the input waveguide 64A, and one of the output waveguides 64B serves as a monitoring waveguide. In a further embodiment of the present disclosure, a ridge waveguide 66 may include a primary waveguide 66A and a semi-circular waveguide 66B coupled to the primary waveguide, and the semi-circular waveguide 66B serves as a resonant cavity. In particular, the input portion or/and the output portion of the ridge waveguides 64 and 66 can be optionally designed to have a taper width, so as to increase the input and output coupling efficiency as well as the efficiency of active or electro-optic devices.

Figure 8:
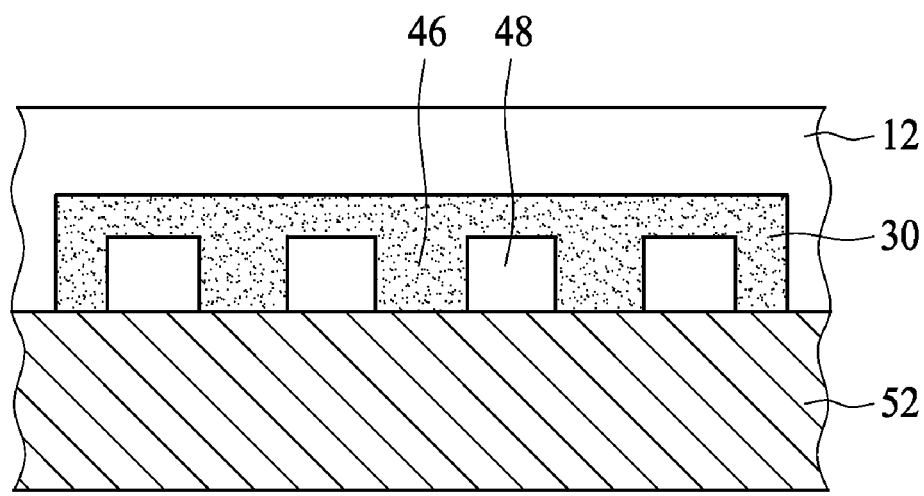
FIG. 8 and FIG. 9 illustrate a method for preparing a wavelength converter structure according to another embodiment of the present invention.
Figure 9:
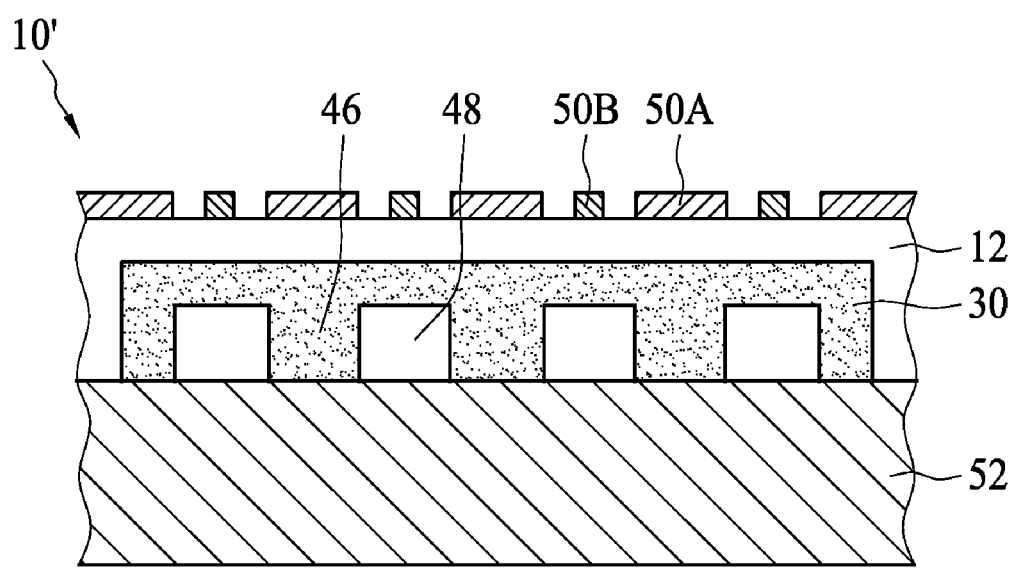

FIG. 8 and FIG. 9 illustrate a method for preparing a wavelength converter structure 10' according to another embodiment of the present invention. The fabrication processes shown in FIG. 1 to FIG. 4 are performed, and the top surface of the ferroelectric substrate 12 is then joined directly to a supporting substrate 52, i.e., in an upside-down manner. In one embodiment of the present disclosure, the refraction index of the supporting substrate 52 is smaller than the refraction index of the ferroelectric substrate 12. Subsequently, a thermal treating process is performed to bond the top surface of the ferroelectric substrate 12 to the supporting substrate 52, and deposition and etching processes are then performed to form at least one controlling pattern such as Bragg grating structures 50A or conductive wires 50B on a second side of the ferroelectric substrate 12 to complete the wavelength converter structure 10', as shown in FIG. 9.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wavelength converter structure, comprising:
   a supporting substrate;
   a ferroelectric substrate including at least one ridge waveguide positioned on a first side of the ferroelectric substrate, the ridge waveguide including a plurality of inverted domains and non-inverted domains, and the ridge waveguide being joined on the supporting substrate; and at least one controlling pattern on a second side of the ferroelectric substrate, and the second side being opposite to the first side,
wherein the ferroelectric substrate includes a plurality of ridge waveguides separated by air gaps.

2. The wavelength converter structure of claim 1, wherein the ridge waveguide includes a primary waveguide and a semi-circular waveguide coupled to the primary waveguide.

3. The wavelength converter structure of claim 1, wherein the controlling pattern includes a Bragg grating structure on the second side of the ferroelectric substrate.

4. The wavelength converter structure of claim 3, wherein the Bragg grating structure is directly on the ridge waveguide.

5. The wavelength converter structure of claim 1, wherein the controlling pattern includes at least one conductive wire on the second side of the ferroelectric substrate.

6. The wavelength converter structure of claim 5, wherein the conductive wire is at the side of the ridge waveguide.

7. The wavelength converter structure of claim of claim 1, wherein the ridge waveguide is joined to the supporting substrate via an adhesive.

8. The wavelength converter structure of claim 7, wherein the refraction index of the adhesive is lower than the refraction index of the ferroelectric substrate.

9. The wavelength converter structure of claim 8, wherein the ferroelectric substrate includes a plurality of ridge waveguides separated by air gaps, and the adhesive fills at least a portion of the air gaps.

10. The wavelength converter structure of claim of claim 1, wherein the ridge waveguide is joined to the supporting substrate directly.

11. The wavelength converter structure of claim 10, wherein the refraction index of the supporting substrate is lower than the refraction index of the ferroelectric substrate.

* * * * *